(12) United States Patent
Pritchard et al.

(10) Patent No.: US 6,731,043 B2
(45) Date of Patent: May 4, 2004

(54) ONE-PIECE FIELD CORE SHELL

(75) Inventors: Robert D. Pritchard, Westlake, OH (US); Michael Hamulak, Amherst, OH (US); Randy Monahan, Lakewood, OH (US)

(73) Assignee: A. J. Rose Manufacturing Co., Avon, OH (US)

( * ) Notice: Subject to any disclaimer, the term of this patent is extended or adjusted under 35 U.S.C. 154(b) by 122 days.

(21) Appl. No.: 10/037,546

(22) Filed: Oct. 22, 2001

(65) Prior Publication Data

US 2003/0076002 A1 Apr. 24, 2003

(51) Int. Cl.$^7$ .................................................. H02K 1/00
(52) U.S. Cl. ........................ 310/265; 310/216; 335/261; 335/279; 335/281
(58) Field of Search .................................. 310/216–218, 310/254, 261, 265; 29/607, 880, 602.1, 894.362, 892; 336/233; 335/281, 335, 249, 251, 255, 261, 279

(56) References Cited

U.S. PATENT DOCUMENTS

| | | | |
|---|---|---|---|
| 4,088,914 A | * | 5/1978 | Aoki .......................... 310/264 |
| 4,388,817 A | | 6/1983 | Victor |
| 4,532,786 A | | 8/1985 | Schaible |
| 4,749,375 A | | 6/1988 | Guevel et al. |
| 4,810,985 A | * | 3/1989 | Mesenich .................... 335/261 |
| 4,829,205 A | * | 5/1989 | Lindgren ..................... 310/166 |
| 4,936,129 A | | 6/1990 | Lipper et al. |
| 4,976,126 A | | 12/1990 | Yamamoto et al. |
| 5,123,157 A | | 6/1992 | Cerny |
| 5,273,385 A | | 12/1993 | Rose et al. |
| 5,619,879 A | | 4/1997 | Friese |
| 5,758,532 A | | 6/1998 | Massée |
| 5,775,151 A | | 7/1998 | Massée |
| 5,806,358 A | | 9/1998 | Rolf |
| 5,836,431 A | | 11/1998 | Jaekel |
| 5,862,696 A | | 1/1999 | Temmann |
| 5,870,818 A | | 2/1999 | Bisaga |
| 5,920,981 A | | 7/1999 | Bushelle et al. |
| 5,927,121 A | | 7/1999 | Rolf et al. |
| 5,937,516 A | | 8/1999 | De Sousa et al. |
| 5,947,853 A | * | 9/1999 | Hodjat et al. ................ 474/166 |
| 5,951,422 A | * | 9/1999 | Roes et al. .................... 474/94 |
| 5,987,952 A | * | 11/1999 | Kutzscher et al. ............. 72/71 |
| 6,045,479 A | | 4/2000 | Victoria et al. |
| 6,105,410 A | | 8/2000 | Säuberlich et al. |
| 6,205,832 B1 | | 3/2001 | Köstermeier |

\* cited by examiner

*Primary Examiner*—Tran Nguyen
(74) *Attorney, Agent, or Firm*—Pearne & Gordon LLP (57) ABSTRACT

A spin-roll formed one-piece field core shell formed from a blank disc of sheet metal. The one-piece field core has an outer annular ring integral to and encircling a center axis of the disc and extending from a bottom external surface in a direction that is perpendicular to the bottom surface of the disc and parallel to the center axis of the disc. The core has an inner annular ring integral to and encircling a center axis of the disc, the inner annular axis is spaced radially inward from the outer annular ring and extends from the bottom external surface in a direction that is perpendicular to the bottom surface of the disc and parallel to the center axis of the disc. The one-piece field core also contains a mounting flange that encircles a center axis of the disc and extends in a perpendicular direction to a top external surface of the disc and parallel to the center axis of the disc. The mounting flange includes a bore that extends from the top of the mounting flange to the bottom external surface of the disc.

21 Claims, 8 Drawing Sheets

ONE-PIECE FIELD CORE SHELL

FIELD OF THE INVENTION

This invention relates generally to a field core shell typically part of a field core assembly used on an electromagnetic clutch of the type found in automotive air conditioning systems to drive a compressor, and more particularly, to a one-piece field core shell and method of shaping the one-piece field core shell by spin-roll forming.

BACKGROUND OF THE INVENTION

A typical electromagnetic clutch contains an annular electromagnet coil that fits into a wire winding pod section in the field core shell of a field core assembly.

Figure 1A:
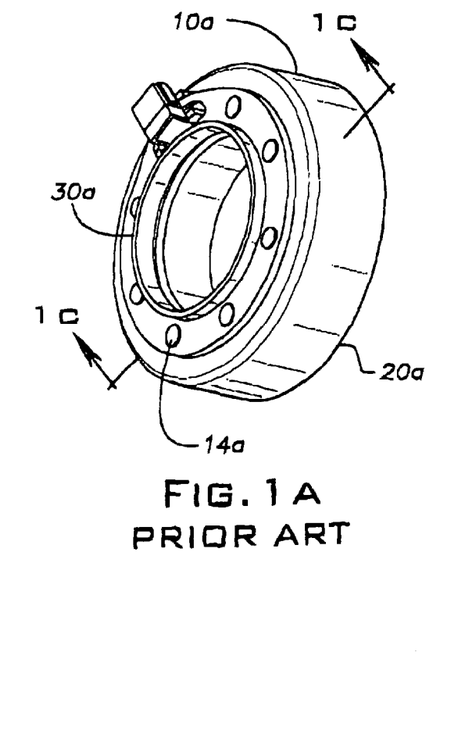
FIG. 1A is a top perspective view of a prior art field core shell.
Figure 1B:
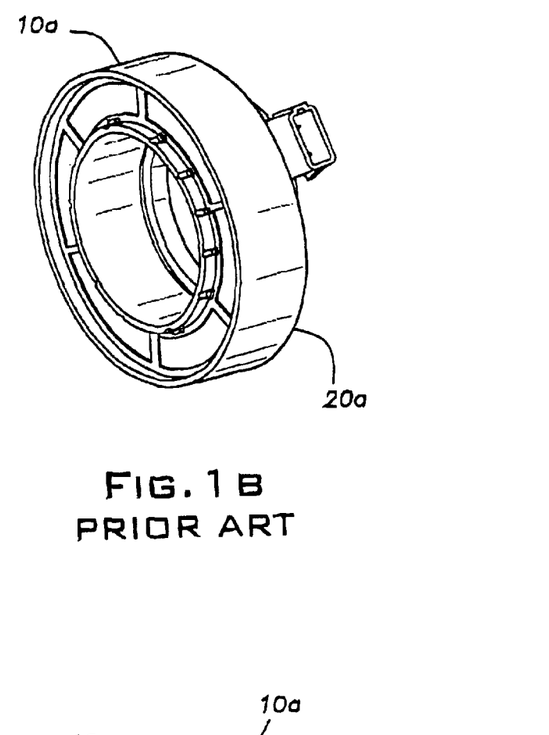
FIG. 1B is a bottom perspective view of the core shell of FIG. 1A, and shows installed wire windings.
Figure 1C:
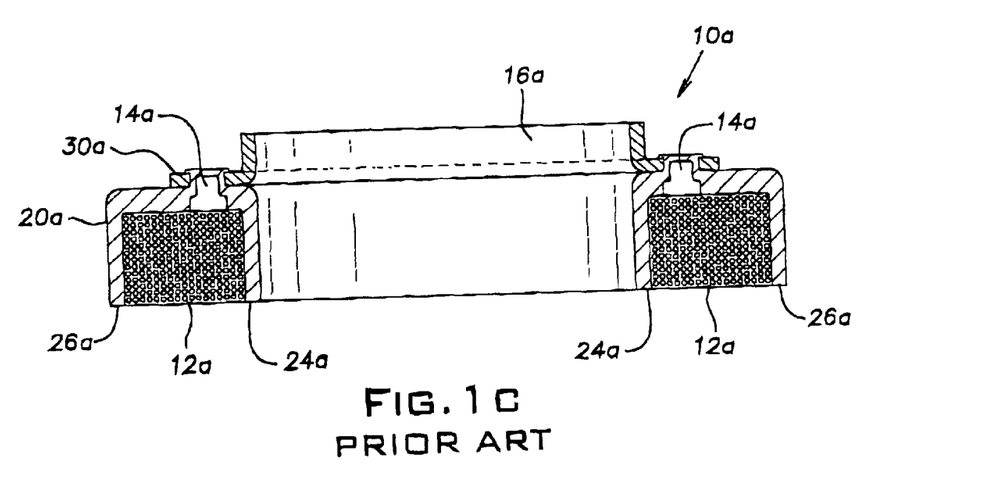
FIG. 1C is a cross section view taken along line 1C—1C in FIG. 1A.

Field core shells have traditionally been manufactured using a two-piece construction. As shown in FIGS. 1A–C, a press formed top angled piece is attached to a press formed annular bottom piece that contains inner and outer rings used to hold the wire windings of the electromagnetic coil. As illustrated in U.S. Pat. No. 5,273,385, incorporated by reference, an integral blind tubular rivet is used to hold the top angled piece to the bottom piece, forming the completed assembly. This assembly is illustrated in cross-section in FIG. 1C.

Forming a field core shell from a two-piece construction described above and as shown in FIG. 1C is a time consuming and costly process. The cost of manufacturing two separate components that comprise the shell and the cost of assembling those components, may be reduced by forming a one-piece shell.

References in the automotive art that disclose spin-roll forming products from a single piece of metal include U.S. Pat. No. 4,388,817, U.S. Pat. No. 4,532,786, and U.S. Pat. No. 4,936,129. Each of these patents discloses a method of forming an automotive wheel from a single piece of metal wherein, during the wheel-forming process, a peripheral portion of the metal preform is split radially to form two annular split portions, which are then formed into different portions of the wheel rim.

The present invention relates to manufacturing a one-piece field core shell by using spin-roll forming methods. A one-piece field core shell that may be used in a field core assembly such as those found on an electromagnetic clutch of the type found in automotive air conditioning systems.

SUMMARY OF THE INVENTION

In accordance with one aspect, the present invention provides for a field core shell made from a single piece of metal typically, a solid circular disk, by a spin-roll forming process. The spin-roll forming process displaces metal from a flat portion (e.g., a flat plate of metal sheet) in a radial and axial direction to produce the one-piece field core shell.

In accordance with another aspect, the present invention provides a spin-roll formed one-piece field core shell that is formed from a disc having top and bottom external surfaces. The core shell has an outer annular ring integral to and encircling a center axis of the disc and extending from the bottom external surface in a direction that is perpendicular to the bottom surface of the disc and parallel to the center axis of the disc. The core shell has an inner annular ring integral to and encircling a center axis of the disc, with the inner annular axis spaced radially inward from the outer annular ring and extending from the bottom external surface in a direction that is perpendicular to the bottom surface of the disc and parallel to the center axis of the disc. The core shell also has a mounting flange integral to the disc, with having a bore extending from the mounting flange to the bottom external surface of the disc.

In accordance with yet another aspect, the present invention provides a method of forming the one-piece field core shell. In the method, a shaping roller is pressed against a side of a spinning annular disc of sheet metal. The shaping roller is moved progressively radially inwardly against the side of the rotating disc which displaces a portion of metal in the form of an axially extending annular wave. The so displaced metal is pressed by an axially moving shaping roller against different mandrels to form a mounting flange and two annular rings opposite the mounting flange to complete the integral one-piece component.

A feature of the invention is to provide a field core shell that is made from a one-piece construction that is less costly and time consuming to manufacture than the current construction.

DETAILED DESCRIPTION OF THE EXAMPLE EMBODIMENTS

In order to better appreciate the present invention, the prior art is briefly discussed. Referring now to FIG. 1A–C, a prior art two-piece field core shell 10*a* is shown having an outer annular ring 26*a* and an inner annular ring 24*a* that form a wire winding pod 20*a*. Using multiple components, a separately formed mounting flange 30*a* is attached to the wire winding pod 20*a* by rivets 14*a* using a number of manufacturing operations.

Figure 2A:
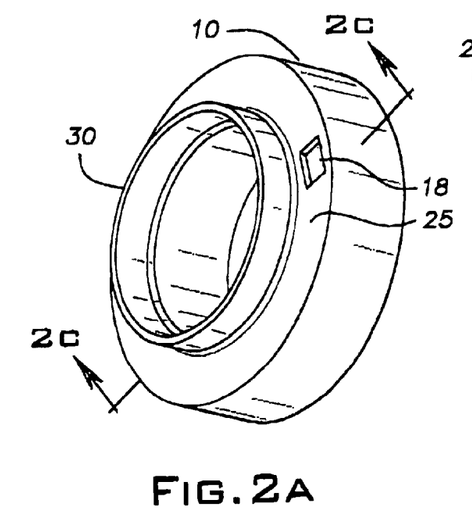
FIG. 2A is a top perspective view of a first embodiment of a field core shell of the present invention.
Figure 2B:
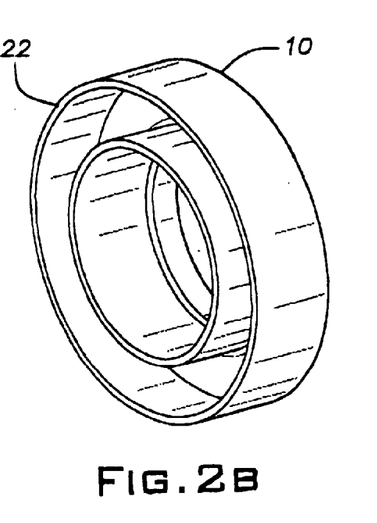
FIG. 2B is a bottom perspective view of the first embodiment of the field core shell of the present invention.
Figure 2C:
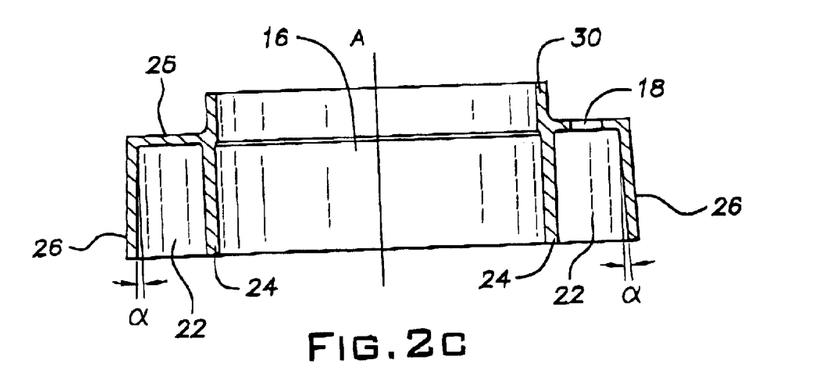
FIG. 2C is a cross section view taken along line 2C—2C in FIG. 2A.

A first embodiment of a one-piece field core shell 10 shown in FIGS. 2A–C is produced from a blank disc of sheet metal. The first embodiment includes a spin-roll formed wire winding pod 22 having an outer annular ring 26, an inner annular ring 24 and a top surface 25. The top surface 25 having a hole 18 to feed wire leads. The mounting flange 30 is spin-roll formed completing the one-piece field core shell 10 of the first embodiment of the present invention.

A first method for forming the first embodiment of the present invention formed from a blank disc of sheet metal is shown in progressive steps in FIGS. 5–9 and will now be described.

Figure 5:
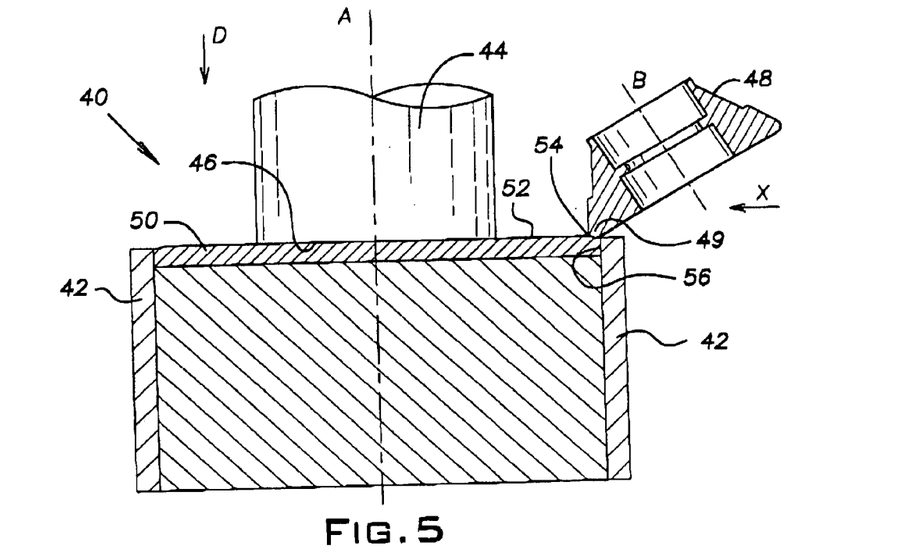
FIG. 5 is a cross-section view of key elements of a spin-roll forming machine and an annular disc positioned in the machine for spin-roll forming.

Referring to FIG. 5, a spin-roll forming machine 40 is shown in an initial run position where the blank disc is starting to be shaped in a form that, when finished, includes the features of the first embodiment of the present invention.

Machine 40 is a versatile piece of equipment that can accommodate mandrels that may form a range of mounting flanges and wire winding pod diameters according to the methods of the present invention. Mandrels are selected and used having the required corresponding diameters needed to form the appropriate mounting flanges and wire winding pods as desired by the field core shell machine operator.

The machine 40 includes a headstock mandrel 42 and a mounting flange forming mandrel 44. A solid circular disc 50 of sheet metal is positioned within a circular recess 56 on the headstock mandrel 42 and is securely clamped thereto by an end face 46 of mounting flange forming mandrel 44. The mounting flange forming mandrel 44 is moved in an axial direction D and pressed firmly against the center of disc 50 to hold it in position during the forming process.

Figure 6:
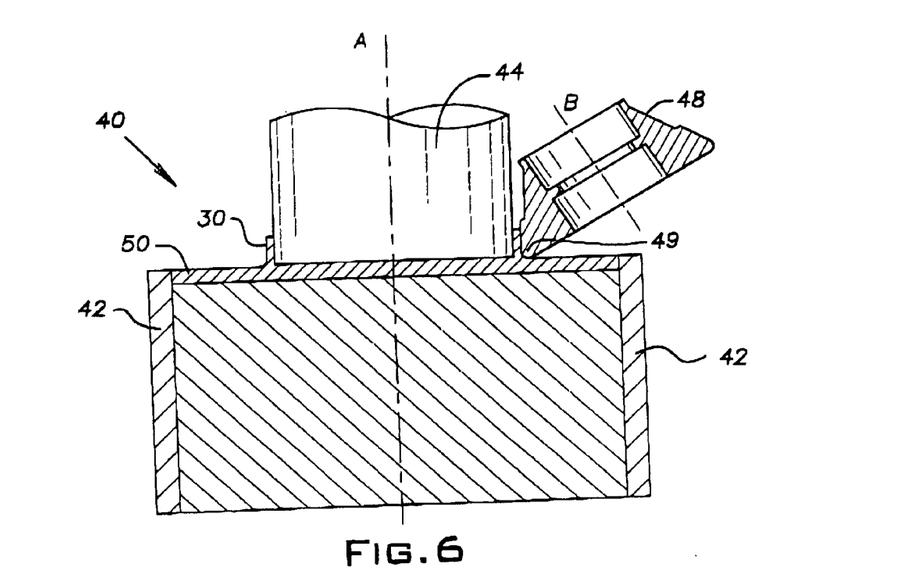
FIG. 6 is a view similar to FIG. 5, but showing a machine at a progressive operational step completing the mounting flange in the first embodiment of the field core shell of the present invention.

A shaping roller 48 is transferred to an initial forming position by moving it in the X direction so that a rounded edge 49 of the shaping roller is pressed against the disc 50. The mandrel and head stock are rotated which spins the disc around an axis A. Shaping roller 48 is also free to rotate around axis B as the disc spins. The shaping roller 48 with its rounded edge 49 moves progressively in direction X from edge 54 (FIG. 5) against the upper face 52 of the disc and displaces metal along the upper face of the disc and thins the disc while forming mounting flange 30 (FIG.6) to a desired height and diameter, for example, as is shown in FIG. 6.

Figure 7:
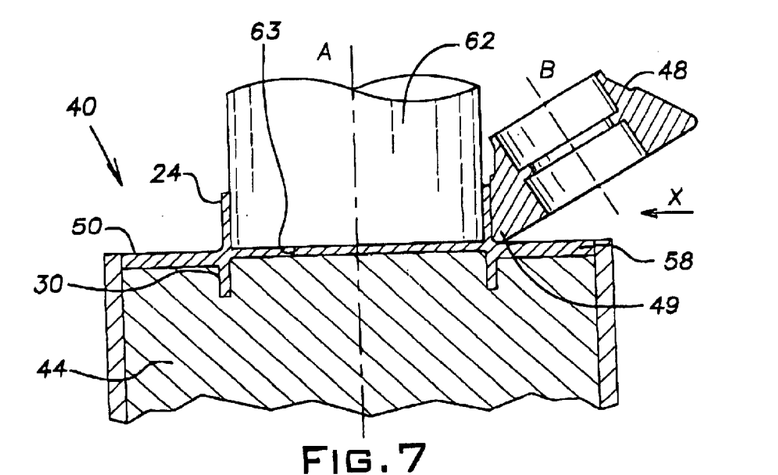
FIG. 7 is a view similar to FIG. 5, but showing the machine at a progressive operational step completing the inner annular ring of the first embodiment of the field core shell of the present invention.

The one-piece field core shell, with its mounting flange 30 formed, is taken from the mandrel 42 and inverted 180 degrees and placed onto a mounting flange mandrel 44 (FIG. 7). The mounting flange mandrel 44 holds the partially formed one-piece field core for its next operation. As shown in FIG. 7, the inner annular ring 24 is now spin-roll formed by shaping roller 48. Mounting flange 30 is pressed firmly into mounting flange mandrel 44, while the partially formed one-piece field core shell is securely clamped by end face 63 of inner annular ring forming mandrel 62. Mounting flange 30 spins about axis A in spin-roll forming machine 40 while the shaping roller 48 is again, as shown in FIG. 5, brought into contact with an upper face 52 of disc 50 at a position proximate the edge 54 of disc 50. The shaping roller 48, with its rounded edge 49, moves progressively in direction X against the side of the disc and displaces metal from the side of the disc and thins the disc while forming the inner annular ring 24 to a desired height and diameter, for example as shown in FIG. 7.

Figure 8:
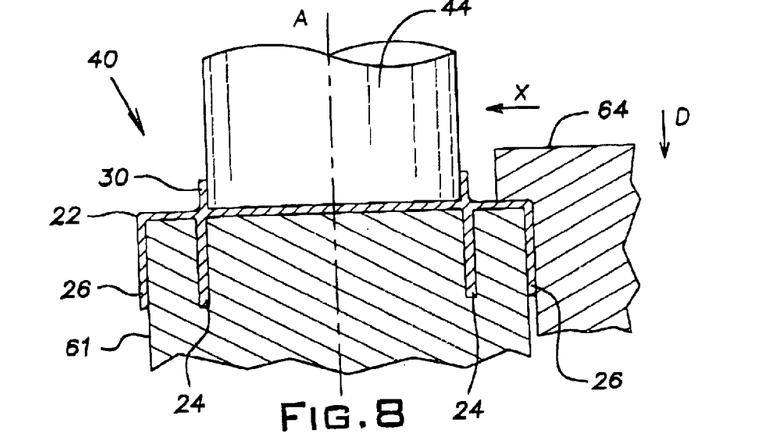
FIG. 8 is a view similar to FIG. 5 but showing the machine at a progressive operational step the outer annular ring of the first embodiment of the field core shell of the present invention.
Figure 9:
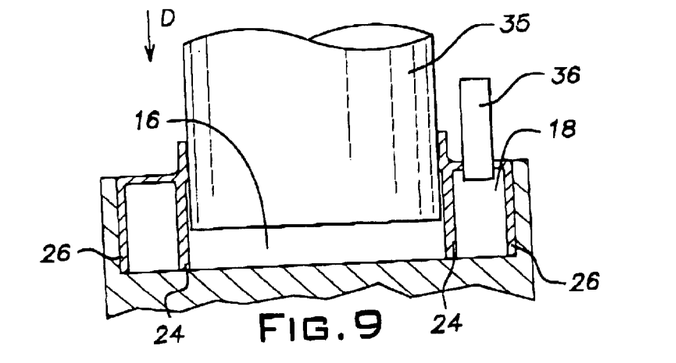
FIG. 9 illustrates the completion of the bore and a hole for wire leads for the first embodiment of the field core shell of the present invention.

Once the inner annular ring 24 is formed, the one-piece field core shell is ready for its final operations. (FIGS. 8 and 9). The one-piece field core shell with its mounting flange 30 and inner annular ring 24 formed, is taken from mandrel 44 and again inverted 180 degrees and placed onto outer annular ring mandrel 61 (FIG. 8). Mandrel 44 and outer annular ring mandrel 61 hold the part in spin-roll forming machine 40 while outer annular ring forming tool 64 moves in the X direction contacting edge 58 as shown in FIG. 7, moving edge 58 in the D direction forming outer annular ring 26 to a desired height and diameter, for example as shown in FIG. 8.

As shown in FIG. 9, the bore 16, used to mount a shaft (not shown) and access hole 18 for the lead wires of the wire windings are then formed using tools 35, 36. The tools may be devices such as a drill or punch or any other tool that can pierce sheet metal. The above-described method of forming the first embodiment from a blank disc of sheet metal thus produces the less costly and easily manufactured spin-roll formed field core shell of the present invention.

Figure 10:
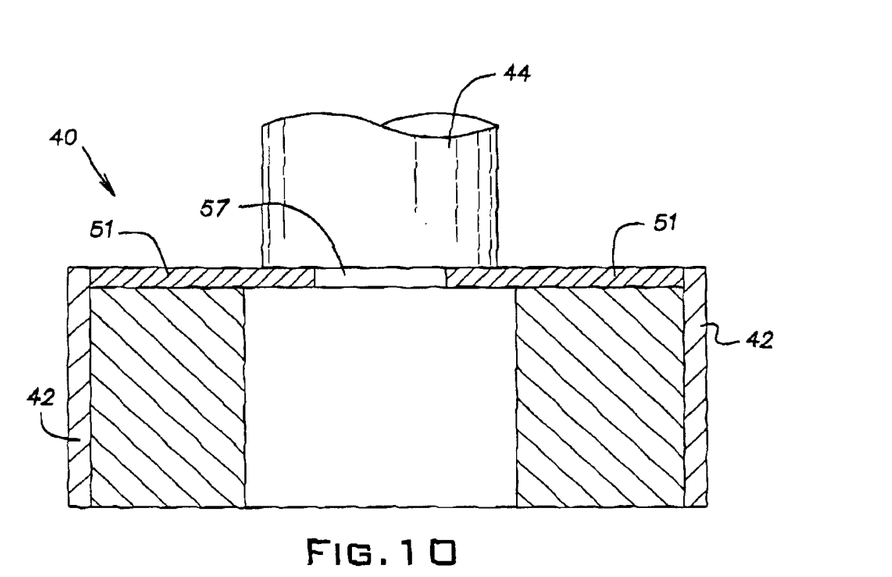
FIGS. 10–13 are cross-section views that illustrate a second method for making the first embodiment of the field core shell of the present invention.
Figure 11:
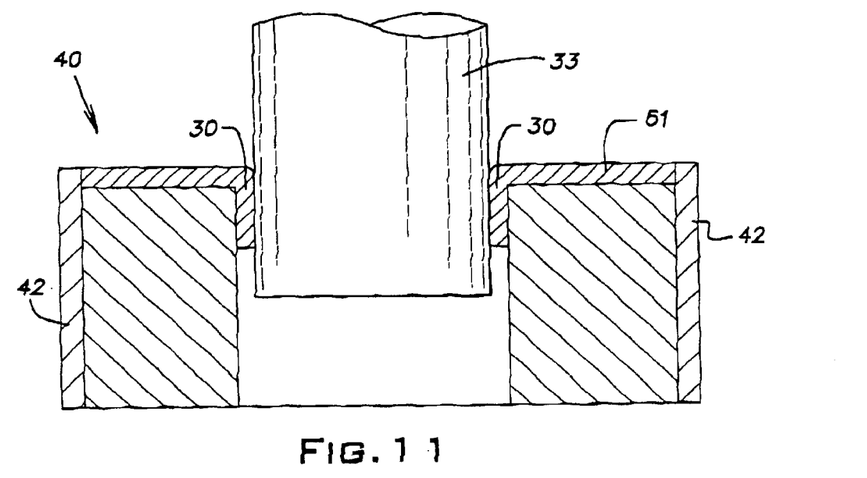

A second method of forming the first embodiment is shown in FIGS. 10–13. An annular disc 51 with a center hole 57 is placed in machine 40 as shown in FIG. 10. A mounting flange 30 and bore is formed using tool 33 by the application of force to a desired height and diameter, for example, as shown in FIG. 11.

Figure 12:
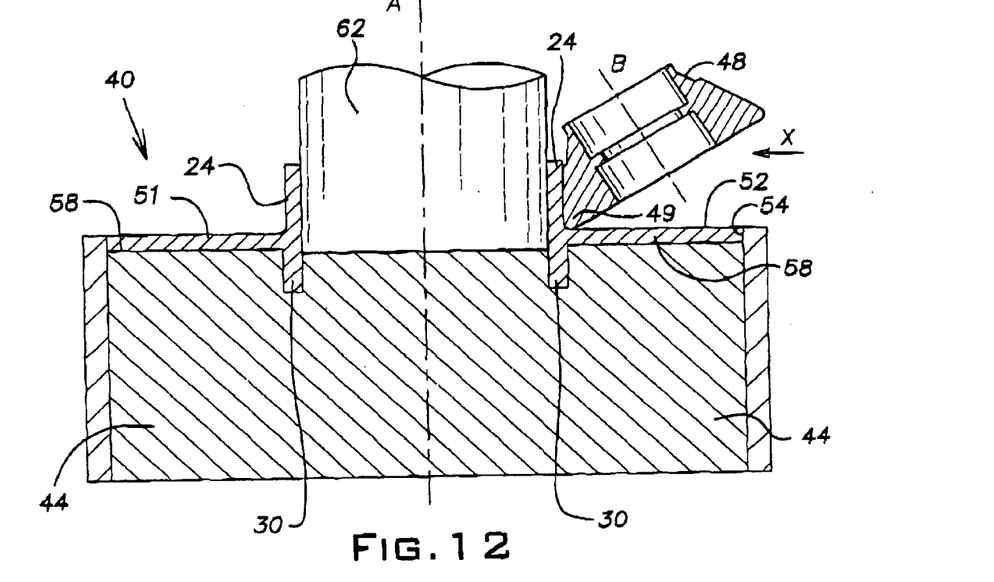

As shown in FIG. 12, the inner annular ring 24 is now spin-roll formed by shaping roller 48. Mounting flange 30 is pressed firmly into mounting flange mandrel 44, while the partially formed one-piece field core shell is also securely clamped in inner annular ring forming mandrel 62. Mounting flange 30 spins about axis A in spin-roll forming machine 40 while the shaping roller 48 is brought into contact with an upper face 52 of disc 51 at a position proximate the edge 54 of disc 51. The shaping roller 48, with its rounded edge 49, moves progressively in direction X against the side of the disc and displaces metal from the side of the disc and thins the disc while forming the inner annular ring 24 to a desired height and diameter, for example, as shown in FIG. 12.

Figure 13:
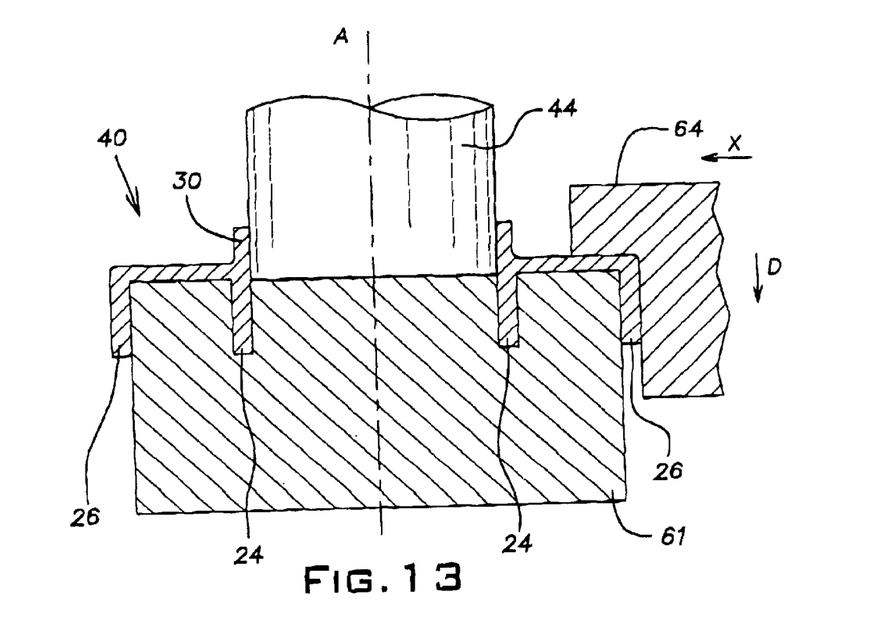

Once the inner annular ring 24 is formed, the one-piece field core shell is ready for its final operation (FIG. 13). The one-piece field core shell with its mounting flange 30 and inner annular ring 24 formed, is taken from mandrel 44 and inverted 180 degrees and placed onto outer annular ring mandrel 61 (FIG. 13). Mandrel 44 and outer annular ring mandrel 61 hold the part in spin-roll forming machine 40 while outer annular ring forming tool 64 moves in the X direction contacting edge 58 (FIG. 12), moving edge 58 in the D direction forming outer annular ring 26 to a desired height and diameter, for example, as shown in FIG. 13. Similar to the process step in FIG. 9, the access hole 18 for the leads for the wire winding is then formed using tool 36.

Figure 4A:
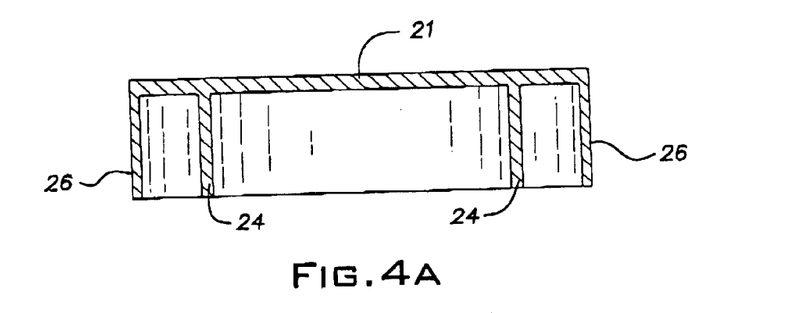
FIG. 4A is a cross section view of a stamped wire winding pod that may be used to make either a first or second embodiment of the field core shell of the present invention.
Figure 4B:
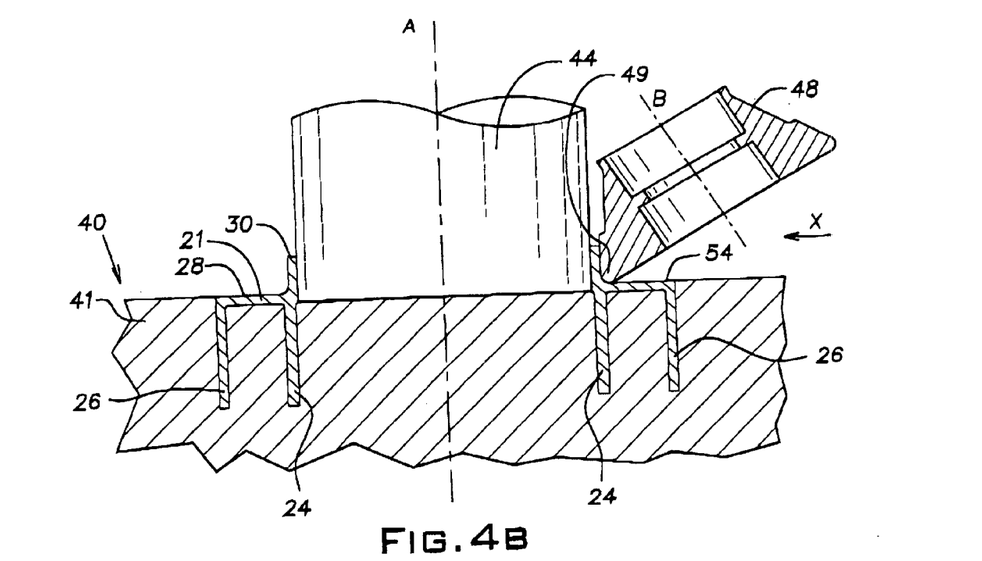
FIG. 4B is a cross section view of the first embodiment of the field core shell made using the stamped wire winding pod in FIG. 4A, with the mounting flange being spin-roll formed.

The first embodiment of the one-piece field core shell 10 of the present invention as shown in FIGS. 2A–C, may also be produced by using a pre-stamped wire winding pod 21 as shown in FIG. 4A. The stamped wire winding pod 21 has outer annular ring 26 and inner annular ring 24 already formed. Stamped wire winding pod 21 is made in a separate operation and is used in place of the spin-roll formed wire winding pod 22. The stamped wire winding pod 21 as shown in FIG. 4B, is placed in machine 40 and as explained below, the mounting flange 30 is spin-roll formed to a desired height and diameter, for example, as shown in FIG. 4B. A bore 16 and access hole 18 for the lead wires of wire windings are also added as shown in FIGS. 2A and 2C.

The method for forming the first embodiment using the stamped wire winding pod 21 of the present invention will now be described with reference to FIG. 4B. The stamped wire winding pod 21 having a top surface 28 is positioned in the spin-roll forming machinery 40 that includes the mounting flange mandrel 44, a stamped wire winding pod mandrel 41 and a shaping roller 48. The shaping roller 48 with its rounded edge 49 displaces a portion of metal from the top surface 28 of the stamped wire winding pod 21 which is supported in mandrel 41.

The shaping roller 48 is transferred to an initial forming position by moving it in direction X so that a rounded edge 49 of the shaping roller is pressed against the disc. The shaping roller 48 with its rounded edge 49 moves progressively in direction X against the top surface 28 of the disc and displaces metal along the upper face of the disc and thins the disc while forming mounting flange 30 to a desired height and diameter, for example, as is shown in FIG. 4B. Similar to the process step in FIG. 9, the bore 16 and access hole 18 for the leads for the wire windings are formed.

Figure 3A:
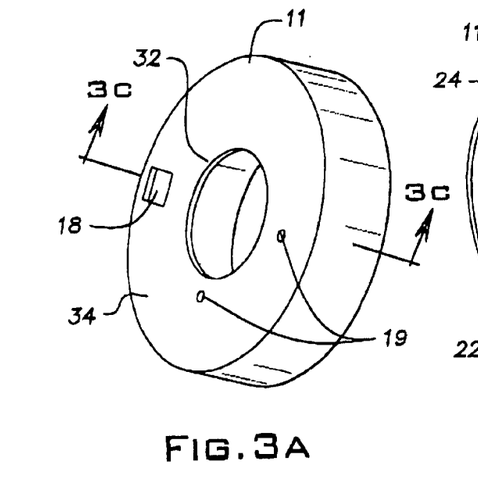
FIG. 3A is a top perspective view of a second embodiment of the field core shell of the present invention.
Figure 3B:
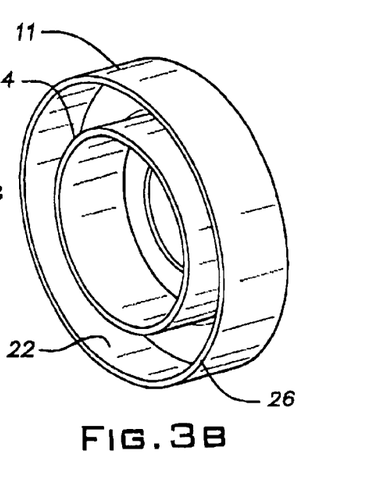
FIG. 3B is a bottom perspective view of the second embodiment of the field core shell of the present invention.
Figure 3C:
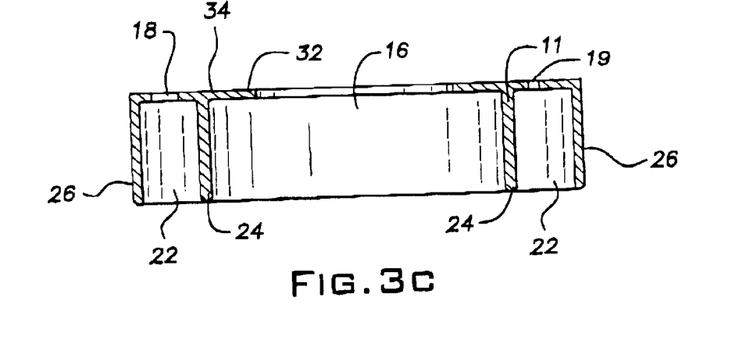
FIG. 3C is a cross section view taken along line 3C—3C in FIG. 3A.

Referring now to FIGS. 3A–C, a second embodiment of the one-piece field core shell 11, has a mounting flange that extends parallel to the top surface 34. The second embodiment is also produced from a blank sheet of sheet metal. The second embodiment includes a spin-roll formed wire winding pod 22, having an outer annular ring 26 and an inner annular ring 24 and holes 18, 19 on the top surface 34 to feed wire leads.

A method for forming the second embodiment of the one-piece field core, as discussed in the paragraph immediately above, follows in the paragraph below. The equipment and methods used to form the second embodiment are similar to the equipment and methods used to form the first embodiment as previously described and illustrated by FIGS. 5–13. The description of the method used to form the second embodiment below will not include any reference to any particular figures cited above.

To form the second embodiment, the spin-roll forming machine 40 first utilizes the inner annular ring forming mandrel 62. A solid circular disc 50 of sheet metal is positioned within a circular recess 56 on the headstock mandrel 42 and is securely clamped thereto by an end face 46 of inner annular ring forming mandrel 62. The inner annular ring forming mandrel 62 is moved in an axial direction D and pressed firmly against the center of disc 50 to hold it in position during the forming process.

A shaping roller 48 is transferred to an initial forming position by moving it in direction X so that a rounded edge 49 of the shaping roller is pressed against the disc. The mandrel and head stock are rotated which spins the disc around an axis A. Shaping roller 48 is also free to rotate as the disc spins. The shaping roller 48 with its rounded edge 49 moves progressively in direction X from edge 54 against the upper face 52 of the disc and displaces metal along the upper face of the disc and thins the disc while forming inner annular ring 24 to a desired height and diameter.

Once the inner annular ring 24 is formed, the second embodiment of the one-piece field core shell is ready for the outer annular ring 26 to be formed. The one-piece field core shell with its inner annular ring 24 formed, is taken from mandrel 44 and inverted 180 degrees and placed onto outer annular ring mandrel 61. Mandrel 44 and outer annular ring mandrel 61 hold the part in spin-roll forming machine 40 while outer annular ring forming tool 64 moves in the X direction contacting edge 58, moving edge 58 in the D direction forming outer annular ring 26 to a desired height and diameter.

Once the outer annular ring 26 is formed, the second embodiment of the one-piece field core shell is ready for its final operation. The center of the circular disk is removed, forming a mounting flange 32 as shown in FIG. 3A. Also similar to the process step in FIG. 9, the access holes 18, 19 for the leads for wire winding are formed.

The inner and outer annular rings of each embodiment of the field core shell as described, may be tapered at an angle alpha (FIG. 2C) in order to allowing the wire windings to enter the wire winding pod formed by the field core shell's annular rings. The tapered angle alpha may be from 0 to 3 degrees from an axis that is parallel to the center axis A of the field core shell as shown in FIG. 2C.

In addition, the inner and outer annular rings of each embodiment of the field core shell as described, extend in a direction that is perpendicular to the bottom surface of the disc and parallel to the center axis of the disc and may be the same distance or one ring may extend farther than the other in length in order to completely capture the wire windings once installed in the field core shell's wire winding pod.

It will be understood by one who is skilled in the art of field cores that a range of mounting flanges and wire winding pod diameters can be provided according to the methods of the present invention by selecting mandrels having the required corresponding diameters to the appropriate mounting flanges and wire winding pods desired.

It is also understood by one who is skilled in the art of spin-roll forming that the order of steps taken to spin-roll form may be reduced or altered from those described above to produce the equivalent one-piece field core shell of the present invention. Also, many types of forming methods equivalent to the spin-roll forming method may be used to produce the desired one-piece field core shell of the present invention. The present invention includes all such equivalent steps and forming methods, and is limited only by the scope of the claims.

Although the invention has been shown and described with respect to certain embodiments, it is obvious that equivalent alterations and modifications will occur beyond those discussed to others skilled in the art upon reading and understanding of the specification. The present invention includes all such equivalent alterations and modifications, and is limited only by the scope of the claims.

What is claimed is:

1. A one-piece field core shell that is formed from a disc having top and bottom surfaces comprising:
   an outer annular ring integrally formed with the disc as one-piece structure from a single sheet of metal material and encircling a center axis of the disc and extending from the bottom surface in a direction that is perpendicular to the bottom surface of the disc and parallel to the center axis of the disc;
   an inner annular ring integrally formed with the disc as one-piece structure from a single sheet of metal material and encircling a center axis of the disc, said inner annular axis spaced radially inward from said outer annular ring and extending from the bottom surface in a direction that is perpendicular to the bottom surface of the disc and parallel to the center axis of the disc; and a mounting flange integral to the disc and having a bore extending from the mounting flange to the bottom surface of the disc.

2. The field core shell as claimed in claim 1 wherein the mounting flange encircles a center axis of the disc and extends in a perpendicular direction to the top surface of the disc and parallel to the center axis of the disc.

3. The field core shell as claimed in claim 2 wherein the bore is sized for attachment to a shaft.

4. The field core shell as claimed in claim 2 wherein said inner annular ring and said outer annular ring form a wire winding pod having a top surface, said wire winding pod having a hole through the top surface of the wire winding pod to feed wire leads.

5. The field core shell as claimed in claim 2 wherein the inner annular ring and the outer annular ring extend in a direction that is perpendicular to the bottom surface of the disc and parallel to the center axis of the disc by the same distance.

6. The field core shell as claimed in claim 2 wherein the inner annular ring and the outer annular ring extend in a direction that is perpendicular to the bottom surface of the disc and parallel to the center axis of the disc and are tapered at an angle alpha.

7. The field core shell as claimed in claim 1 wherein the mounting flange extends parallel to a plane of the top surface of the disc.

8. The field core shell as claimed in claim 7 wherein the bore is sized for attachment to a shaft.

9. The field core shell as claimed in claim 7 wherein said inner annular ring and said outer annular ring form a wire winding pod having a top surface, said wire winding pod having a hole through the top surface to feed wire leads.

10. The field core shell as claimed in claim 7 wherein the inner annular ring and the outer annular ring extend in a direction that is perpendicular to the bottom surface of the disc and parallel to the center axis of the disc by the same distance.

11. The field core shell as claimed in claim 7 wherein the inner annular ring and the outer annular ring extend in a direction that is perpendicular to the bottom surface of the disc and parallel to the center axis of the disc and are tapered at an angle alpha.

12. A one-piece field core shell comprising:

a stamped wire winding pod having a top surface, the wire winding pod consisting of inner and outer annular rings; and a mounting flange integral to the wire winding pod and having a bore extending from the mounting flange to a bottom surface of the wire winding pod.

13. The field core shell as claimed in claim 12 wherein the mounting flange is spin-roll formed.

14. The field core shell as claimed in claim 13 wherein the mounting flange encircles a center axis of the wire winding pod and extends in a perpendicular direction to the top surface of the wire winding pod and parallel to the center axis of the wire winding pod.

15. The field core shell as claimed in claim 13 wherein the mounting flange extends parallel to a plane of the top surface of the wire winding pod.

16. The field core shell as claimed in claim 14 or 15 wherein the bore is sized for attachment to a shaft.

17. The field core shell as claimed in claim 14 or 15 wherein said top surface of said inner and outer annular rings having a hole through the top surface to feed a wire lead.

18. The field core shell as claimed in claim 14 or 15 wherein the inner annular ring and the outer annular rings are the same distance in length.

19. The field core shell as claimed in claim 14 or 15 wherein the inner annular ring and the outer annular ring are tapered at an angle alpha.

20. A field core shell which comprises:

an outer annular ring integrally spin-roll formed with the disc as one-piece structure, wherein said outer annular ring encircling a center axis of the disc and extending from the bottom surface in a direction that is perpendicular to the bottom surface of the disc and parallel to the center axis of the disc;

an inner annular ring integrally formed with the disc as one-piece structure, wherein said inner annular ring encircling a center axis of the disc, said inner annular axis spaced radially inward from said outer annular ring and extending from the bottom surface in a direction that is perpendicular to the bottom surface of the disc and parallel to the center axis of the disc; and a spin-roll formed mounting flange integral to the disc and having a bore extending from the mounting flange to the bottom surface of the disc.

21. A field core assembly comprising:

a wire winding pod having a top and bottom surface comprising an outer annular ring integrally formed with the disc from a single sheet of metal material, wherein said outer annular ring encircling a center axis of the disc and extending in a direction perpendicular to the bottom of the wire winding pod and parallel to the center axis of the wire winding pod, an inner annular ring integrally formed with the disc from a single sheet of metal material, wherein said inner annular ring encircling a center axis of the disc, said inner annular axis spaced radially inward from said outer annular ring and extending in a direction perpendicular to the bottom of the wire winding pod and parallel to the center axis of the wire winding pod;

a mounting flange that encircles a center axis of the wire winding pod and extends in a direction perpendicular to the top surface of the wire winding pod and parallel to the center axis of the wire winding pod, the wire winding pod having a bore extending from the mounting flange to the bottom of the wire winding pod and a hole in the top surface of the wire winding pod to feed wire winding leads;

wire windings located inside the wire winding pod having wire leads feed through the hole in the top surface of the wire winding pod; and an electrical connector attached to the top surface of the wire winding pod for connecting said field core assembly to an external source.

* * * * *